US006980959B1

(12) United States Patent
Garrow et al.

(10) Patent No.: US 6,980,959 B1
(45) Date of Patent: Dec. 27, 2005

(54) CONFIGURING MECHANICAL EQUIPMENT (75) Inventors: Gary R. Garrow, Burbank, CA (US);
Charles P. Newton, III, Southlake, TX (US); Patrick E. Weir, San Francisco, CA (US); David P. West, II, Newnan, GA (US); Michael Wetzer, Redwood City, CA (US)

(73) Assignee: Accenture LLP, Palo Alto, CA (US)

( * ) Notice: Subject to any disclaimer, the term of this patent is extended or adjusted under 35 U.S.C. 154(b) by 537 days.

(21) Appl. No.: 09/690,793

(22) Filed: Oct. 17, 2000

(51) Int. Cl.$^7$ .......................................... G06F 17/60
(52) U.S. Cl. ................. 705/7; 705/8; 705/9; 705/10; 701/50; 324/754; 324/765; 172/7; 72/96
(58) Field of Search ...................... 705/7–10; 701/50; 324/754, 765; 172/7; 72/96

(56) References Cited

U.S. PATENT DOCUMENTS

| | | |
|---|---|---|
| 4,908,775 A | 3/1990 | Palusamy et al. |
| 5,216,612 A | 6/1993 | Cornett et al. |
| 5,311,562 A | 5/1994 | Palusamy et al. ........... 376/215 |
| 5,331,579 A | 7/1994 | Maguire, Jr. et al. |
| 5,596,507 A | 1/1997 | Jones et al. |
| 5,710,723 A | 1/1998 | Hoth et al. |
| 5,737,728 A | 4/1998 | Sisley et al. |
| 5,778,381 A * | 7/1998 | Sandifer ................. 707/104.1 |
| 5,877,961 A | 3/1999 | Moore |
| 5,920,846 A | 7/1999 | Storch et al. |
| 5,963,911 A | 10/1999 | Walker et al. |
| 5,987,474 A | 11/1999 | Sandifer |
| 6,067,486 A * | 5/2000 | Aragones et al. ............. 701/29 |
| 6,110,214 A | 8/2000 | Klimasauskas |
| 6,128,543 A | 10/2000 | Hitchner |
| 6,175,934 B1 | 1/2001 | Hershey et al. |
| 6,192,325 B1 | 2/2001 | Piety et al. |
| 6,230,480 B1 | 5/2001 | Rollins, III .............. 60/39.182 |

FOREIGN PATENT DOCUMENTS

GB    1162557 A  * 12/2001  ........... G06F 17/60

OTHER PUBLICATIONS

McQueen, G., "Aircraft Maintenance, Industrial Maintenance to Plant Operations", Aug. 1996, disclose aircraft maintenance systems. Retrieved from IDS.*
McQueen, G., "Aircraft Maintenance," *Industrial Maintenance & Plant Operations*, Aug. 1996.
MIL-HDBK-61, Military Handbook, "Configuration Management Guidance," Sep. 1997.
International Search Report dated Nov. 16, 2001, for corresponding international application PCT/US01/29384.
International Search Report dated Dec. 28, 2001, for corresponding international application PCT/US01/32154.
International Search Report dated Jan. 2, 2002, for corresponding international application PCT/US01/32576.

* cited by examiner

Primary Examiner—James A Reagan
(74) Attorney, Agent, or Firm—Brinks Hofer Gilson & Lione (57) ABSTRACT

A method and system of managing a configuration of mechanical equipment provides a structured procedure for managing information on parameters of the mechanical equipment to facilitate the maintenance of safety, legal compliance, performance, and reliability of the mechanical equipment. A desired configuration of the mechanical equipment is defined based on a design objective, such as safety, reliability, performance, or any combination of the foregoing objectives. An actual configuration of the mechanical equipment is determined based on an evaluation of the mechanical equipment. Upgrade requirements are planned for upgrading the actual configuration to the desired configuration if the actual configuration is noncompliant with the desired configuration.

24 Claims, 5 Drawing Sheets

CONFIGURING MECHANICAL EQUIPMENT

FIELD OF INVENTION

This invention relates to a method and system for managing a configuration of mechanical equipment.

BACKGROUND OF THE INVENTION

Mechanical equipment refers to a machine or machinery that is formed of a defined arrangement of multiple components. A component may represent a part, an assembly of parts, a subassembly of a part, an element, or another constituent of a machine. A component is not limited to mechanical elements and is broadly defined to include an electrical assembly, an electrical system, an electronic system, a computer controller, software, or the like. Mechanical equipment includes heavy equipment and capital-intensive equipment that is movable or fixed. Mobile mechanical equipment includes airplanes, busses, locomotives, ships, cranes, heavy trucks, earth-moving equipment, or the like. Fixed mechanical equipment includes electrical power generators, industrial presses, manufacturing equipment, or the like.

A configuration defines the identity of the components (e.g., parts), a specification of the components, and the relationship among the arrangement of components of the mechanical equipment, among other things. Because some components are interchangeable with substitutes, the configuration of mechanical equipment may vary throughout a life span of the mechanical equipment as equipment-related work (e.g., maintenance, repair, or overhaul work) is performed. The configuration of mechanical equipment may change because of a revision of product definitions or a review (e.g., a financial and performance review) of the mechanical equipment. Further, even during the manufacturing process, the manufacturer of the mechanical equipment may substitute different components (e.g., parts) from different suppliers to customize the mechanical equipment, to meet a certain technical specifications for the mechanical equipment, or to save manufacturing costs on the mechanical equipment. For example, the manufacturer may change technical specifications of mechanical equipment to rectify manufacturing anomalies or to facilitate more reliable production. Thus, standard as-built documentation on the mechanical equipment may contain erroneous information on the configuration of the equipment.

Maintenance, overhaul and repair personnel may keep few records of the actual configuration of the equipment because of over-reliance on the manufacturer's specifications, manuals, and as-built documentation. Even if configuration records are available, the records may be difficult to use or access. Thus, a need exists for promoting the maintenance of accurate records on equipment-related work with ready access to maintenance, overhaul and repair personnel.

In the context of an airplane as the mechanical equipment, the airplane may be viewed as a member of a fleet subject to the fleet specifications in general manuals, rather than a unique configuration. If generalizations from the fleet specifications are applied to an airplane, the generalization may not apply because of changes in the configuration made during maintenance (e.g., maintenance, repair or overhaul) or earlier manufacturing changes. While the practical experience of the mechanic or technician may overcome the informational gap between the documentation and the actual configuration, such practical experience is often communicated inefficiently by word of mouth and documentation may be unavailable. Moreover, repair and maintenance may become more costly where the mechanic or technician needs to figure out the implications of departures from expected or wrongly documented configurations on an ad-hoc basis.

The operator or owner of the mechanical equipment may operate equipment with a sub-optimal configuration that does not comply with a desired technical specification because of a lack of adequate procedures for identification of the desired technical specification and tracking compliance with the desired technical specification. For example, a typical performance guarantee or warranty for an airplane, as the mechanical equipment, may cover the number of landings/takeoffs, engine hours, and general availability of flight readiness of the aircraft. However, an operator or an owner of an aircraft may fail to enforce the warranty or performance guarantee against the manufacturer because the lack of adequate record-keeping and monitoring of the actual performance of the aircraft that are necessary to demonstrate a performance deficiency. Thus, a need exists for a procedure that facilitates monitoring of compliance with a desired technical performance objective for the mechanical equipment.

In regulated industries, such as the airline industry, the noncompliance with a desired technical specification may represent a violation of a regulatory standard, which can subject the operator or owner of the mechanical equipment to economic penalties. Moreover, noncompliance with a configuration may pose a serious threat to the safety of passengers aboard a noncompliant aircraft. Thus, a need exists for facilitating compliance of a configuration of mechanical equipment with applicable safety requirements on a timely basis.

BRIEF SUMMARY OF THE INVENTION

In accordance with the invention, a method and system of managing a configuration of mechanical equipment provides a structured procedure for managing information on parameters of the mechanical equipment to facilitate the maintenance of safety, legal compliance, performance, and reliability of the mechanical equipment. A desired configuration of the mechanical equipment is defined based on a design objective, such as safety, reliability, performance, or any combination of the foregoing objectives. An actual configuration of the mechanical equipment is determined based on an evaluation of the physical condition of the mechanical equipment. Upgrade requirements are planned for upgrading the actual configuration to the desired configuration if the actual configuration is noncompliant with the desired configuration.

The system and method for managing a configuration of mechanical equipment facilitates the consistent attainment and sustenance of a desired configuration of the mechanical equipment in a timely manner. The desired configuration may involve compliance with a regulatory standard, meeting a technical specification, and improving reliability of the mechanical equipment through proper selection and interaction of the parts or assemblies of the mechanical equipment.

DETAILED DESCRIPTION OF PREFERRED EMBODIMENTS

Figure 1:
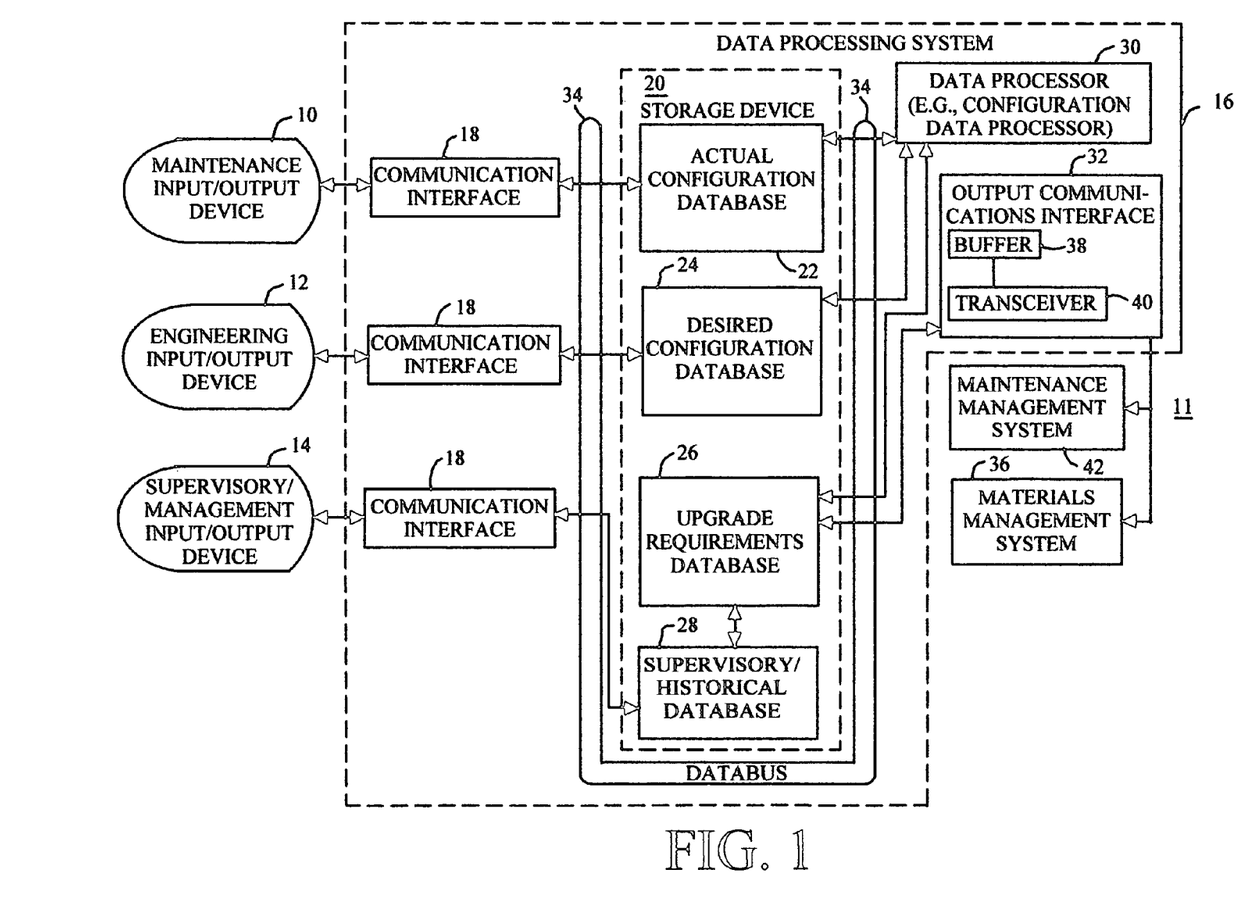
FIG. 1 is a block diagram of a system for managing a configuration of mechanical equipment in accordance with the invention.

The definitions set forth in the background apply to the entire specification. In accordance with the invention, FIG. 1 shows a system 11 for managing a configuration of mechanical equipment. A maintenance input/output device 10, an engineering input/output device 12, and a supervisory input/output device 14 are coupled to a data processing system 16 to permit the input of data into the data processing system 16. The data processing system 16 may be coupled to a materials management system 36 to permit the output of data to the materials management system 36. Further, the data processing system 16 may be coupled to maintenance management system 42 to provide data for operation of the maintenance management system 42.

The data processing system 16 includes a storage device 20 coupled to a data processor 30 and communications interfaces 18 coupled to the data processor 30 via a databus 34. The databus 34 and communications interfaces 18 provide access of the input/output devices (10, 12 and 14) to one or more databases (22, 24, 26 and 28). The arrows interconnecting the components of the data processing system 16 represent data flow over the databus 34. Although only one databus is shown in FIG. 1, in other embodiments multiple databuses and/or multi-processor computer architecture may be used to practice the invention.

The storage device 20 refers to any computer storage mechanism that supports a magnetic storage medium, an optical storage medium, an electronic storage medium, or any other suitable storage medium. The storage device 20 may contain an actual configuration database 22, a desired configuration database 24, a upgrade requirements database 26, and a supervisory/historical database 28. The data processing system 16 supports data storage, retrieval, and queries of the databases stored in the storage device 20.

The maintenance input/output device 10 is coupled to the actual configuration database 22 via a communications interface 18. The engineering input/output device 12 is coupled to the desired configuration database 24 via a communications interface 18. The supervisory input/output device 14 is coupled to the supervisory database 28 via a communications interface 18. In one embodiment, the maintenance input/output device 10, the engineering input/output device 12, and the supervisory input/output device 14 may represent computer work stations or other data input/output devices. In another embodiment, the maintenance input/output device 10 may comprise a monitor for manually or automatically monitoring the operational performance or longevity (e.g., time and/or operational cycle compliance) of a part, an assembly, or the entire mechanical equipment. For example, the monitor may provide a report of assembly longevity data or part longevity data for storage in the actual configuration database 22.

The actual configuration database 22 and the desired configuration database 24 provide input configuration data to the data processor 30. The data processor 30 outputs upgrade requirements data to the upgrade requirements database 26 and the supervisory database 28 based on the input of the configuration data. The supervisory database 28 may include historical configuration data on previous configurations and associated performance of previous configurations of the mechanical equipment. The upgrade requirements database 26 is coupled to an output communications interface 32.

The communications interfaces 18 may comprise buffer memory coupled to transceivers. The communications interfaces 18 may support a parallel port, a serial port, or another computer port configuration.

The output communications interface 32 may comprise buffer 38 memory coupled to a transceiver 40. The output communications interface 32 is adapted to transmit upgrade requirements data from the upgrade requirements database 26 to one or more of the following devices: (1) the materials management system/purchasing system 36, (2) maintenance management system 42, and any other procurement or enterprise resource planning system. For example, the output communications interface 32 may contain a software interface, a hardware interface, or both to facilitate the proper exchange of information with the materials management system 36, the maintenance management system 42, a purchasing system, or an enterprise resource planning system.

The desired configuration database 24 contains desired configuration data on the mechanical equipment. The desired configuration data contains an equipment identifier (e.g., tail number of an airplane) that identifies the entire mechanical equipment, a part identifier that identifies a part of the mechanical equipment, an assembly identifier that identifies an assembly of parts of the equipment, a specification description that describes the specification of a part, and a relationship description that describes the relationship of a part to the mechanical equipment or a subassembly thereof. For example, the relationship description may include the mounting position of a part on the mechanical equipment. In one embodiment, the desired configuration database 24 may include operating restrictions on the mechanical equipment because of the presence of a particular part or a particular arrangement of parts of the mechanical equipment.

The actual configuration database 22 contains actual configuration data on the mechanical equipment that reflects an actual or present status of the mechanical equipment. The actual configuration data includes an equipment identifier (e.g., tail number of an airplane) that identifies the entire mechanical equipment, a part identifier that identifies a part of the mechanical equipment, an assembly identifier that identifies an assembly or group of parts of the equipment, a specification description that describes the specification of the part, and a relationship description that describes the relationship of a part to the mechanical equipment or a subassembly thereof. For example, the relationship description may include the mounting position of a part on the mechanical equipment. In one embodiment, the actual configuration database 22 may include operating restrictions on the mechanical equipment because of the presence of a particular part or arrangement of particular parts on the mechanical equipment.

The contents of the actual configuration database 22, the desired configuration database 24, and the upgrade requirements database 26 may vary with time. Accordingly, configuration data on a particular mechanical equipment may only remain valid for a limited duration. Upon or before expiration of the duration, the configuration is preferably updated. If the contents of the databases are updated with sufficient frequency to avoid outdated configuration data, the update procedure may be referred to as a real-time procedure. The real-time procedure seeks to minimize inaccuracy of the configuration data by reflecting changes to the actual configuration of the mechanical equipment as the changes occur with a minimal lag time thereafter. Changes to the actual mechanical equipment may be necessary or proper to facilitate improvement of the actual configuration. Thus, the data processing system 16 permits maintenance activities (e.g., maintenance, overhaul or repair) to be coordinated in real time on an ongoing basis with the latest actual configuration data and the latest upgrade requirements.

A maintenance worker, such as a technician or a mechanic who is responsible for maintaining or repairing the mechanical equipment, enters actual configuration data into the actual configuration database 22 during or after an inspection or servicing of the mechanical equipment. The inspection may involve a visual inspection, a physical inspection, a mechanical test, an electrical test, disassembly of portions of the mechanical equipment, or other activities that might uncover defects or nonconformities with respect to the desired configuration. The data processing system 16 updates the actual configuration data in the actual configuration database 22 as soon as possible after the inspection or the servicing of the mechanical equipment to maintain the accuracy of the actual configuration database 22. For example, the maintenance input/output device 10 may be a portable electronic device that is equipped to establish a wireless communications link or otherwise communicate with the data processing system 16.

The data processor 30 compares the actual configuration to the desired configuration. The difference between the actual configuration and the desired configuration may be referred to as the upgrade requirement. The upgrade requirement defines the departure of the actual configuration from the desired configuration and indicates the necessary actions to bring the mechanical equipment into conformity with the desired configuration. The data processor 30 determines the upgrade requirement. The data processor 30 may express the upgrade requirement in terms of (1) a component requirement (e.g., part, assembly or subassembly requirement) and (2) a human resource requirement that is required to bring the actual configuration in conformity with the desired configuration. The upgrade requirements may contain part identifiers of old parts that require updating of a particular mechanical equipment to gain compliance with the desired configuration. The component requirement is not limited to electrical or mechanical hardware. For example, the component requirement may include modifications of software features and software instructions that are associated with or integral to the functioning of the mechanical equipment. The human resource requirement may include the scheduling of one or more maintenance workers (e.g., technicians and mechanics) to install, repair, adjust, reconfigure, replace or otherwise perform a service associated with the component requirement for the mechanical equipment.

The data processor 30 may define an interim solution to eliminate potential delay in the execution of a complete upgrade to the mechanical equipment. For example, the interim solution may reduce or eliminate the delay for an upgrade, where requisite components are not immediately available or qualified service personnel are not available for a complex service procedure. The interim solution covers the time period after a noncompliance with the desired configuration is detected and prior to placing the actual configuration in conformity with the desired configuration. The interim solution may define time/operational limitations or restrictions for the mechanical equipment prior bringing the discrepant component of the mechanical equipment into conformity. The interim solution may entail restricted usage of the non-conforming equipment. Further, the human resources requirement may include provisional operational training to properly operate the mechanical equipment under the time/operational limitations or restrictions.

The component requirements (e.g., part requirements) are forwarded over the output communications interface 32 to the materials management system 36 or another computer system that supports purchasing or procurement of components for the mechanical equipment. The materials management system 36 is a computer system for obtaining components for the mechanical equipment from a supplier or obtaining components from existing internal sources (e.g., a parts depot or a warehouse). The component requirements may include a quantity, a description, a manufacturer's equivalent component (e.g., part) number, or other component (e.g., part) parameters. With respect to mechanical equipment that has a software component, the component requirements may include version or revision information or any other parameter necessary to provide the upgrade of the software configuration associated with the mechanical equipment.

In an alternative embodiment, the parts requirements are forwarded over to an enterprise resource planning system, rather than the materials management system 36. An enterprise resource planning system is a computer system that facilitates the exchange of information between different operational or business systems of a business entity. For example, an enterprise resource planning system may facilitate the exchange of information between purchasing, engineering, manufacturing, and management systems of a corporation.

In general, the supervisory database 28 supports management's oversight of the managing of the configuration. Additionally, the supervisory database 28 retains the historical records of prior configuration alterations. The supervisory database 28 tracks historic configurations of the mechanical equipment and any associated failure or defect with historic configurations. A description of the failure or defect, a date of detection of the failure of defect, determined causal factors from failure analysis activities, and resolution or repair of the failure or defect are preferably noted in the supervisory database 28. The foregoing failure or defect data may supplement or be used to update mean-time-before failure (MTBF) data provided by the manufacturer on parts or assemblies of the equipment. In turn, the updated MTBF may be used to change the desired configuration with input from engineering over the engineering input/output device 12.

The supervisory database 28 may record approvals of engineering changes to the desired configuration database 24. In addition, the supervisory database 28 may record and archive approvals of work, past configurations, or inspections by maintenance staff. Thus, the supervisory database 28 promotes accountability of mechanics, technicians, engineers and management for activities related to managing the configuration. This supervisory database 28 may represent a repository of historical records, including satisfaction records of executed configuration changes for the purpose of regulatory compliance, safety compliance, or otherwise.

Figure 2:
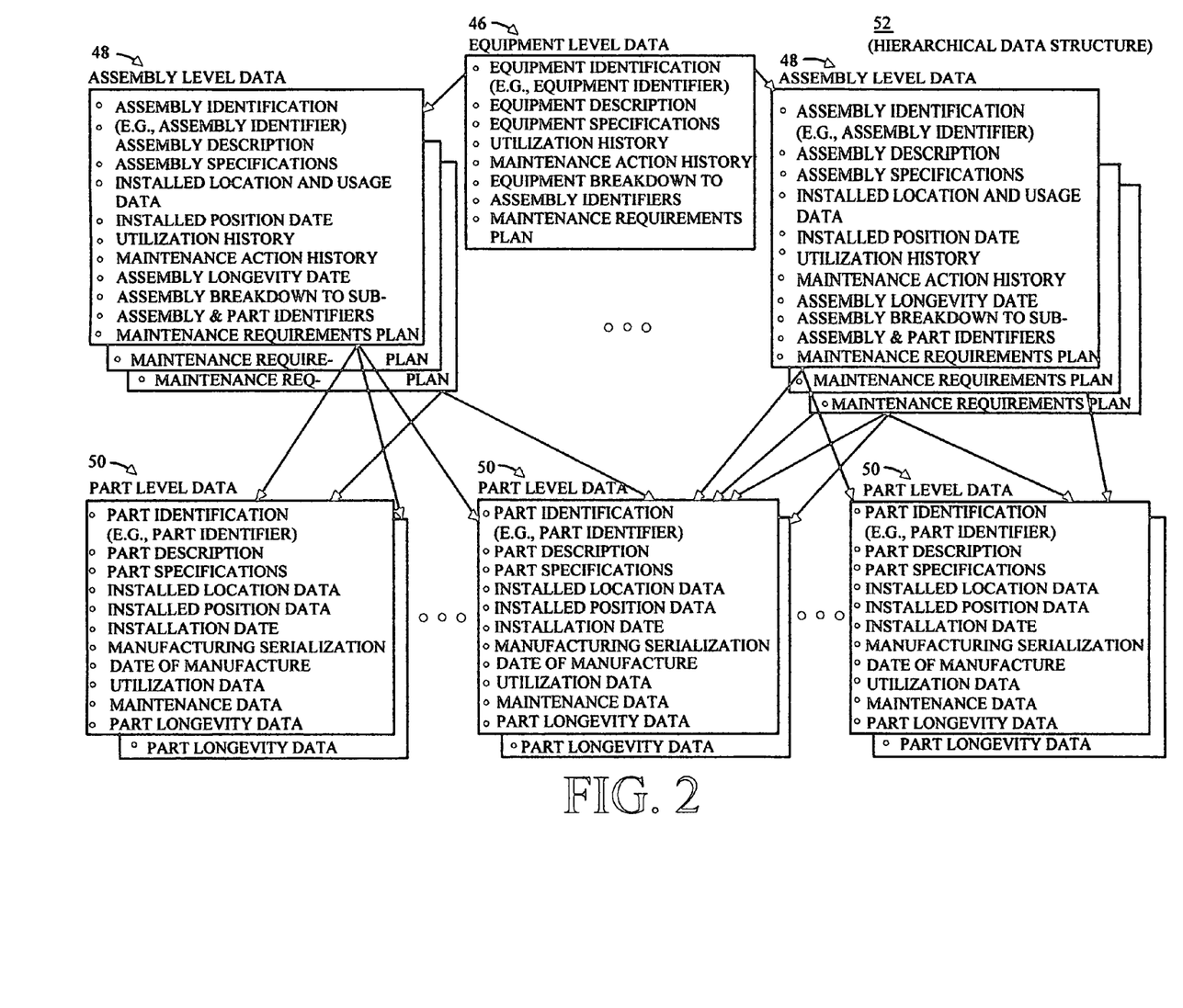
FIG. 2 is a block diagram of an illustrative hierarchical data structure for organizing the configuration data in accordance with the invention.

FIG. 2 is a diagram that illustrates an example of a hierarchical data structure 52 that may be used to practice the invention. The hierarchical data structure 52 of FIG. 2 may be used to store data in the actual configuration database 22, the desired configuration database 24, or both. For example, the hierarchical data structure 52 of FIG. 2 may be used as a template for configuration data to be stored prior to populating the actual configuration database 22 and the desired configuration database 24 with the configuration data.

A hierarchical data structure 52 defines one configuration of the mechanical equipment that is valid for a validity duration. Accordingly, the multiple hierarchical data structures 52 are associated with corresponding configurations of mechanical equipment in the actual configuration database 22, the desired configuration database 24, or both. A configuration of mechanical equipment has equipment level data 46, assembly level data 48, and part level data 50. The assembly level data 48 and part level data 50 may be referred to as component level data. The equipment level data 46 occupies the highest level of the hierarchy, whereas the part level data 50 occupies the lowest level of the hierarchy in the example illustrated in FIG. 2. In actual practice, the assembly level data 48 may occupy multiple tiers of the hierarchical data structure 52. Accordingly, a component (e.g., a part or an assembly) may be introduced into more than one single level of the hierarchy. The assembly level data 48 occupies an intermediate level or intermediate levels of the hierarchy, as illustrated. The equipment level data 46 may contain references to the intermediate assembly level data 48, the part level data 50, or both. The equipment level data 46, the assembly level data 48, and the part level data 50 represent configuration data, which may vary with time, defined conditions, or both.

In an alternate embodiment, the hierarchical data structure may contain additional levels to the hierarchy, such as a subassembly level intermediate to the assembly level data 48 and the part level data 50.

The equipment level data 46 includes an equipment identification (e.g., equipment identifier), equipment description data, equipment specification data, utilization history data, and a maintenance history data. Further, the equipment level data 46 may contain an equipment breakdown of the equipment in terms of a list of assembly identifiers, part identifiers, or both that constitute the equipment. The utilization history data may include parameters such as hours of active operation of the mechanical equipment, distance traveled by mobile mechanical equipment, years of continued service, or the like. The maintenance history data may contain a record of parts and assemblies replaced on a given mechanical equipment and associated replacement dates. The maintenance history data may include a log of routine service performance. The maintenance requirement plan data may also be associated with equipment definition or integrated with the equipment definition to form a cohesive, integrated upgrade plan.

The assembly level data 48 includes an assembly identification (e.g., assembly identifier), assembly description data, assembly specification data, installed location data, usage data, installed position date data, utilization history data, maintenance history data, and assembly longevity data. The assembly level data 48 preferably includes a maintenance requirement plan for maintaining the assembly in proper operational order. Further, the assembly level 48 may contain an assembly breakdown of the equipment in terms of part identifiers, subassemblies, or other components that constitute the equipment.

The installed location data defines a mounting position of the assembly with respect to the mechanical equipment. The installed position data defines a position of a component or part of the assembly with respect to the assembly. The assembly longevity data may represent a MTBF estimates for a corresponding assembly. The longevity data may be expressed in terms of one or more of the following parameters: (1) time and in service, (2) operational cycles, (3) chronological age, (4) physical operational conditions, and (5) other expressions of longevity of service. The operational conditions include temperature, pressure, induced loads, and the like. The MTBF information may be provided by a manufacturer and validated or updated by subsequent testing and monitoring of the performance of the assembly.

The part level data 50 includes a part identification (e.g., part identifier), part description data, part specification data, installed location data, installed position data, installation date, utilization history, manufacturing serial numbers (e.g., lot numbers), date of manufacture, utilization data, maintenance history data, and part longevity data. A manufacturer or an affiliate of the manufacturer assigns manufacturing serial numbers and a date of manufacture the a part. Part longevity data may represent an MTBF estimate for a corresponding part. The MTBF may be provided by a manufacturer and validated or updated by subsequent testing and monitoring of the performance of the part.

Figure 3:
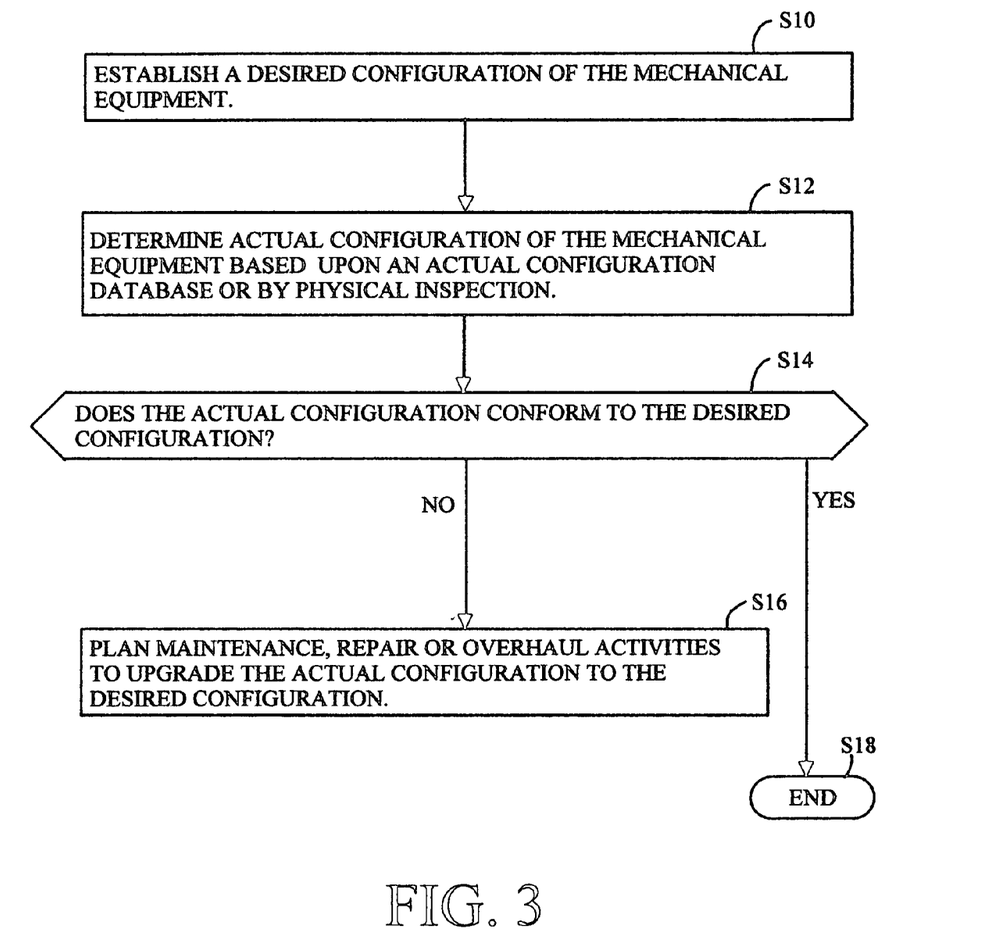
FIG. 3 is a flow chart of a method for managing the configuration in accordance with the invention.

FIG. 3 is a flow chart of a method for managing a configuration of mechanical equipment. The method of FIG. 2 begins in step S10.

In step S10, a desired configuration of the mechanical equipment is established based on an engineering design or objective that meets a reliability, safety, or performance goal of the mechanical equipment. For example, the engineering design may be configured to meet a reliability goal based on statistical failure data on parts, assemblies, or the entire mechanical equipment. Accordingly, the user of the engineering input/output device 12 may wish to update the previously desired configuration with a current desired configuration because of an engineering change.

A user of the engineering input/output device 12 (e.g., a computer work station) enters a desired configuration of the mechanical equipment into the desired configuration database 24 based on compliance with one or more of the following criteria: technical specifications, reliability, availability of equipment, safety regulations, regulatory requirements, and performance requirements. In one example, the user may enter an update of the desired configuration into the engineering input/output device 12 to foster compliance with a new technical standard. In another example, the desired configuration may be updated on regular basis after an evaluation of reliability feedback on the mechanical equipment, an assembly thereof, or a part thereof. In yet another example, a user of the engineering input/output device 12 may establish the desired configuration based upon operational performance of a part, an assembly, a component, or an entire mechanical equipment.

An update to the desired configuration may involve replacing an old part having a lesser longevity with a substituted part having a greater longevity. Likewise, an update to the desired configuration may involve replacing an old assembly having a lesser longevity with a substituted assembly having a greater longevity.

In step S12, an actual configuration of the mechanical equipment is evaluated based on an inspection or reference to an up-to-date actual configuration database 22. An actual database may be referred to as an as-maintained database because the database generally indicates the as-maintained or current condition of the mechanical equipment. An actual configuration database 22 may be considered up-to-date if an inspection was recently conducted within a maximum time interval from the present time. The actual configuration may be determined or verified based on disassembly and inspection of at least a portion of the mechanical equipment. A user of the maintenance input/output device 10 (e.g., computer work station) enters an actual configuration of the mechanical equipment into the actual configuration database 22 based on a physical inspection, a visual inspection, a test of the mechanical equipment, or reference to an up-to-date actual configuration database 22.

In step S14, the data processor 30 determines if the actual configuration complies with the desired configuration for the mechanical equipment. For example, the data processor 30 determines compliance based upon the logical and physical configuration of the mechanical equipment expressed as configuration data with respect a particular time. The data processor 30 retrieves records of configuration data from the actual configuration database 22 and the desired configuration database 24 that are associated with the same mechanical equipment. The configuration data is generally time sensitive. The actual configuration and the desired configuration may be associated with time stamps to facilitate an evaluation of the latest condition of the mechanical equipment. The time stamps may indicate absolute time or a relative time relationship between the actual configuration and the desired configuration data.

The data processor 30 may query or search the actual configuration database 22 and the desired configuration database 24 by equipment identifier, assembly identifier, or part identifier to retrieve records for the same mechanical equipment. The records may be organized as files or another suitable data structure. Once one or more records for the mechanical equipment are retrieved, the data processor 30 may compare data records on a record-by-record basis, where the compared records of configuration data are associated with substantially the same time period. The data processor 30 identifies and flags differences in the physical and logical configuration of the mechanical equipment between actual configuration data and the desired configuration data associated with the same time period.

In one embodiment, the retrieval records from the desired configuration database 24 and the actual configuration database 22 may be limited to records affected by recent changes or updates to the desired configuration database 24. The limiting of the retrieval and comparison to affected records reduces the load on the processor 30 that would otherwise result from a comparison of all records related to an equipment identifier. Accordingly, the processing time of the data processor 30 may be reduced commensurately with the reduction in the load.

In an alternative embodiment, the data processor 30 preferably considers all or most of the records for an applicable time period and an applicable equipment identifier (or an entire configuration), in the desired configuration database 24 for the comparison with the actual configuration database 22. The configuration may be expressed in terms of a physical configuration, a logical configuration, or both. The physical configuration, the logical configuration, or both may vary with time. The configuration may be defined by a temporal parameter to indicate the status of the configuration at a particular time, with a range of times, or the like. If the data processor 30 determines that the actual configuration does not comply with the desired configuration, the method continues with step S16. However, if the data processor 30 determines that the actual configuration does comply with the desired configuration, the method ends with step S18.

In step S16, the data processor 30 plans upgrade requirements to upgrade the actual configuration to the desired configuration if the actual configuration is noncompliant. The data processor 30 may determine the upgrade requirements by comparing the actual configuration to the desired configuration with regards to physical, logical, and time characteristics associated with the actual configuration and the desired configuration. For example, the data processor 30 may identify a component (e.g., part or subassembly) of the mechanical equipment that is noncompliant (physically, logically or temporally) with the desired configuration. The identified noncompliant component may be stored in the upgrade requirements database 26 along with an associated equipment identifier for the mechanical equipment. Further, the upgrade requirements may contain requisite labor requirements, modification instructions, supporting tool and equipment information, and acceptance criteria to install the identified noncompliant component and achieve the desired (i.e., upgraded) configuration.

The upgrade requirements database 26 may send the identified part number, a requirement date, and other informational elements required to achieve the upgraded configuration, or both to the materials management system 36. In turn, the materials management system 36 facilitates the timely acquisition/provisioning of a component (e.g., part, or subassembly) and other measures that support the upgrade effort represented by the component in a timely manner. In one embodiment, the materials management system 36 or purchasing system may be manned by purchasers or administrators to procure required parts and assemblies.

The upgrade requirements data preferably includes scheduling data and planning data for bringing together resources, such as the requisite parts, tools, equipment for support of the effort, modification instructions for the human resources, acceptance criteria with testing equipment and repair personnel at a specific time and place to complete upgrade requirements to achieve the desired configuration.

The planning of maintenance, repair and overhaul activities of step S16 may be executed in accordance with several alternative techniques that are not mutually exclusive. In accordance with a first technique, the planning of step S16 includes procuring a required part for the desired configuration and scheduling human resources consistent with availability of the required part. In accordance with a second technique, step S16 includes procuring the required assembly for the configuration and scheduling human resources consistent with the availability of the required assembly. In accordance with a third technique, step S16 includes providing part level data on the mechanical equipment to a user via an input/output device (e.g., maintenance input/output device 10) for a given point in time within a usable life of the mechanical equipment. In accordance with a fourth technique, step S16 includes providing a serial number of a component of the mechanical equipment at any given point in time for a given point in time within its usable life to manage the at least one of the safety, reliability, and performance. In accordance with a fifth technique, step S16 may include scheduling and bringing together at least two of the following items at a specific time and place: requisite parts, technical instructions, supporting equipment, acceptance criteria and procedures, tools, and repair personnel.

Figure 4:
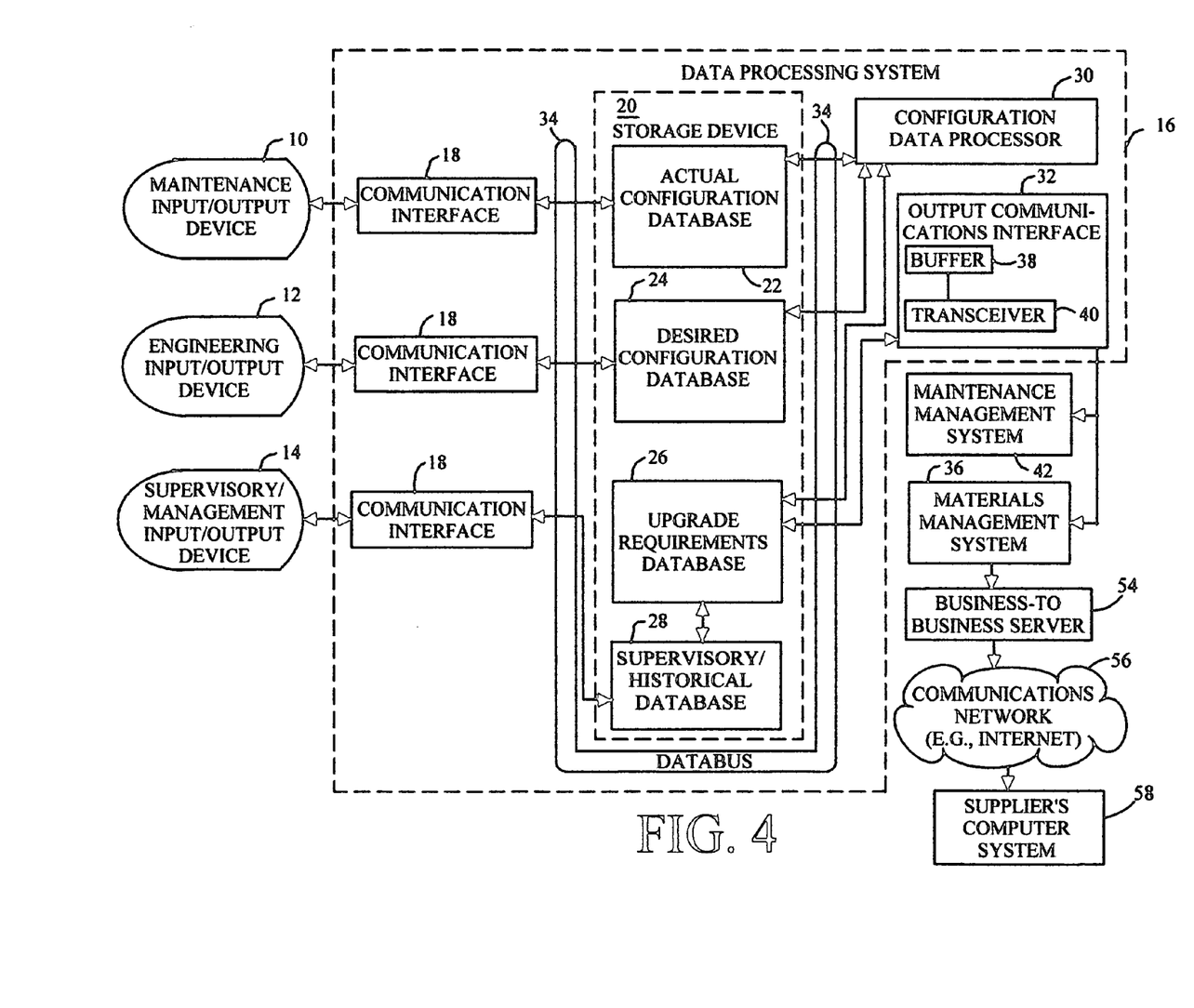
FIG. 4 is a block diagram of an alternate embodiment of a system for managing a configuration of mechanical equipment in accordance with the invention.

In another embodiment of a data processing system shown in FIG. 4, the materials management system 36 system may be automated to communicate to a supplier's computer system 58 via a business-to-business server 54 and a communications network 56. FIG. 4 is similar to FIG. 1 except the business-to-business server 54 provides a communications interface between the materials management system 36 of one business entity to the computer system 58 (e.g., customer fulfillment center) of another business entity.

The business-to-business server 54 may facilitate the exchange of data over the communications network 56 (e.g., the Internet) to support the automated transactions. Like reference numbers in FIG. 1 and FIG. 4 indicate like elements.

Figure 5:
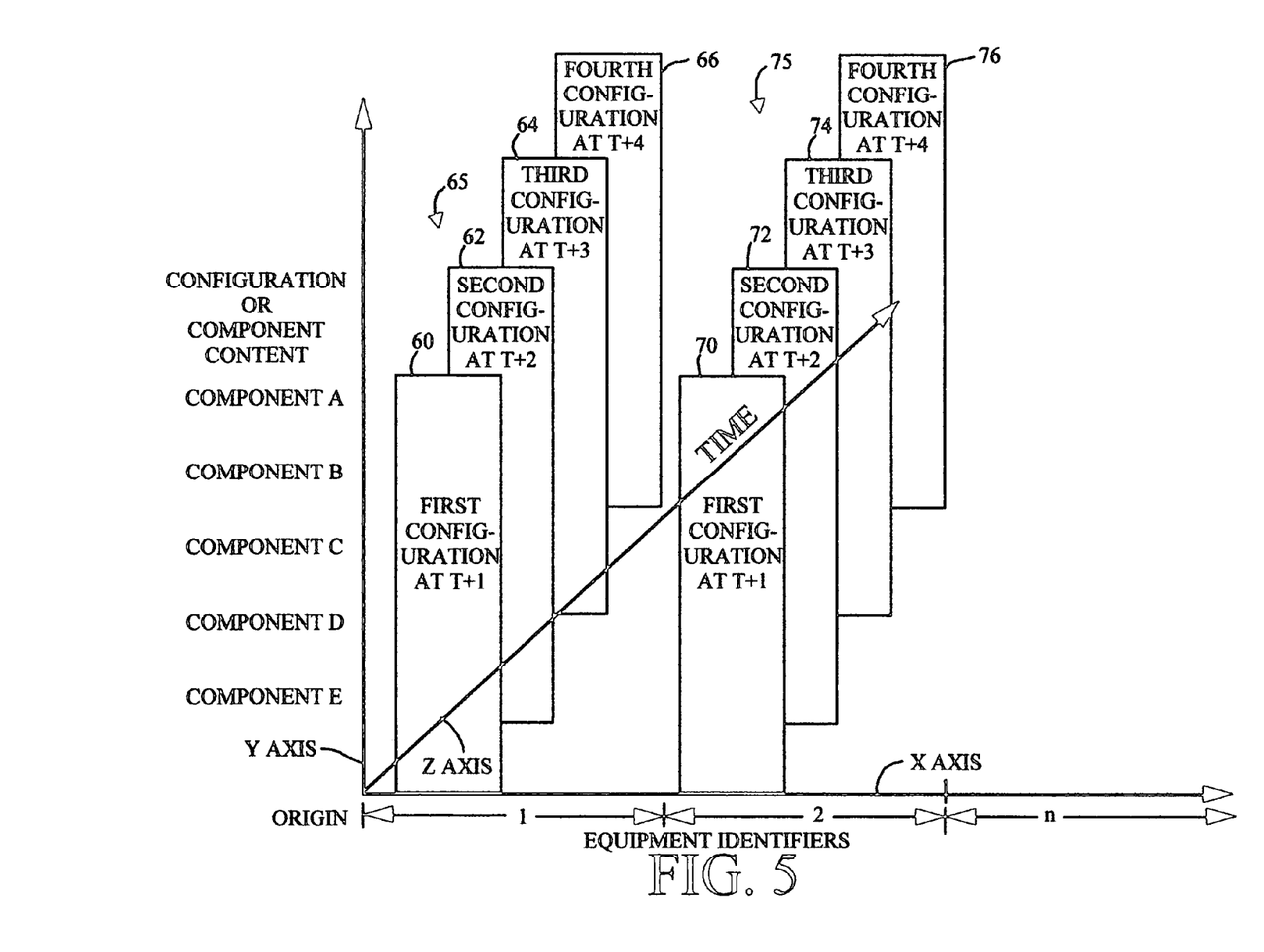
FIG. 5 is a graph that shows multiple configurations per each mechanical equipment over time in accordance with the invention.

FIG. 5 shows a graph that illustrates how configuration data associated with different equipment identifiers varies over time. An x axis represents equipment identifiers. Here, for purposes of illustration, the equipment identifiers are represented by integer numbers ranging from 1 to n. A y axis represents a set of configuration data or a configuration. Each configuration may be expressed as a collection of different components along with relationships between or among the components. The z axis represents time. As shown in FIG. 5, the x axis, the y axis and z axis are generally orthogonal to each other.

Although the configuration data may be maintained for virtually any number of unique equipment identifiers, FIG. 5 shows respective groups (65, 75) of configurations associated with two equipment identifiers (1,2). The first group 65 of configurations includes a first configuration 60 at a reference time, a second configuration 62 at the reference time plus an interval, a third configuration 64 at the reference time plus another interval, and a fourth configuration 66 at the reference time plus another interval. The second group 75 of configurations includes a first configuration 70 at a reference time, a second configuration 72 at the reference time plus an interval, a third configuration 74 at the reference time plus another interval, and a fourth configuration 76 at the reference time plus another interval. The reference time for the first group 65 and the second group 75 may be the same or different. The equipment identifier may be affiliated with a series of successive configurations from creation of the mechanical equipment to destruction or end of life of the mechanical equipment. The data processing system 16 of the invention facilitates the tracking of the successive configurations associated with corresponding equipment identifiers. In accordance with FIG. 5, the data processing system 16 may store the first configuration through the third configuration, while designating the fourth configuration the latest as-maintained or current configuration of the mechanical equipment.

Although the method of maintaining the configuration of the mechanical equipment may be applied to numerous types of machinery, in one example, the mechanical equipment represents an aircraft. In the case of the aircraft, the equipment identifier may be referred to as a tail designator. The configuration of an airplane may be defined by a tail designator. Every tail designator (e.g., tail number) has a unique configuration, scheduling, and planning requirements. Even the same model of aircraft may differ because of variations in maintenance activity or part substitutions during manufacturing.

A tail designator is a unique identifier. Each tail designator provides a mechanism for tracking the profitability or maintenance expense of an associated aircraft. Further, each aircraft can be regarded as a profit/loss center that is identified by the tail number of the aircraft.

Even the same model or model numbers of planes may differ because of maintenance activity or part substitutions during manufacturing. A tail number may represent a group or list of constituent parts. That is, each tail designator may be associated with an entire configuration of an aircraft. The configuration defines the list of constituent part as well as one or more relationships between the constituent parts or between constituent parts and the entire aircraft.

The upgrade requirements coordinate the delivery of one or more following items to the location of the aircraft: labor, skills, parts, technical instructions, acceptance criteria, tools, support and testing equipment. The location of the aircraft may vary over time in the context of a mobile airplane. For example, the aircraft may comprise a commercial plane that transports passengers between two or more cities. The system and method coordinates the availability of labor and parts to fix an airplane at a particular location at a specific time. This upgrade requirement will also define the disposition of removed or replaced prior elements of the equipment configuration. The upgrade requirements for the aircraft may be specific to certain parts of the aircraft. For example, the upgrade requirements may apply just to an engine of a plane, rather than the entire plane. The maintenance plan may consider the longevity or life expectancy of constituent components as well as the life expectancy of the entire aircraft. For example, an aircraft engine may have a life expectancy separate from the airplane itself.

The method of maintaining a desired configuration of mechanical equipment facilitates compliance with regulations and laws by tracking an actual configuration of the mechanical equipment and providing a structured update procedure. The desired configuration or its underlying specifications may be established so that they meet applicable regulatory standards or are approved by regulatory authorities. As regulations and laws change, the desired configuration database 24 readily supports updating in a timely manner to facilitate compliance. The method of maintaining a desired configuration may be used to maximize the longevity of parts and assemblies to extend the longevity of the mechanical equipment. Incremental increases in the longevity and commercial use of capital-intensive infrastructure may lead to decreased expenditures (or at least delayed expenditures) for new capital equipment. Maintaining a desired configuration may lead to more predictable longevity for the mechanical equipment, standard inventories of parts, which may permit reduced inventory of spares and replacement parts. The reliability of the equipment may be enhanced by weeding out poor performing parts, poor performing assemblies, or even poor performing mechanical equipment.

The data processing system 16 is well-suited for responding in a timely manner to the configuration-related events in the supply chain of components, in the inventory management of components and human resources for maintaining the mechanical equipment, and in the financial management of the mechanical equipment.

The foregoing description of the method and system describes several illustrative examples of the invention. Modifications, alternative arrangements, and variations of these illustrative examples are possible and may fall within the scope of the invention. Accordingly, the following claims should be accorded the reasonably broadest interpretation, which is consistent with the specification disclosed herein and not unduly limited by aspects of the preferred embodiments disclosed herein.

What is claimed is:

1. A method of maintaining a configuration of mechanical equipment, comprising the steps of:
   retrieving, by a data processor, a desired configuration of the mechanical equipment based on a design objective of the mechanical equipment, wherein the desired configuration includes configuration data on an equipment identifier, an equipment description, an assembly identifier, an assembly description, a part identifier, a part description data, an installation location data, an installation position data, a part specification data, an assembly specification data, and an equipment data, and wherein the design objective includes at least one of safety, reliability, and performance;
   retrieving, by the data processor, an actual configuration of the mechanical equipment, wherein the actual configuration includes configuration data on an equipment identifier, an equipment description data, an assembly identifier, an assembly description data, a part identifier, a part description, an installed position data, an installation date, a utilization history data, a maintenance history data, a longevity information, a part specification data, an assembly specification data, and an equipment specification data;

comparing, electronically with the data processor, the desired configuration with the actual configuration to determine if the actual configuration complies with the desired configuration; and generating, by the data processor in accordance with the comparison of the desired configuration with the actual configuration, an upgrade requirement plan for upgrading the actual configuration to the desired configuration if the actual configuration is noncompliant.

2. The method according to claim 1 wherein the upgrade requirement plan includes part level data on the mechanical equipment for a given point in time within a usable life of the mechanical equipment.

3. The method according to claim 2 wherein the upgrade requirements plan includes a serial number of a component of the mechanical equipment at any given point in time for a given point in time within its usable life to manage the at least one of the safety, reliability and performance.

4. The method according to claim 1 wherein the generating step includes obtaining a required part for the desired configuration and scheduling human resources consistent with availability of the required part.

5. The method according to claim 1 wherein the generating step includes procuring a required assembly for the desired configuration and scheduling human resources consistent with the availability of the required assembly.

6. The method according to claim 1 wherein the desired configuration is based upon monitoring operational performance of a part.

7. The method according to claim 1 wherein the desired configuration is based upon monitoring operational performance of an assembly.

8. The method according to claim 1 wherein the desired configuration is based upon monitoring operational performance of the mechanical equipment.

9. The method according to claim 1 wherein the desired configuration is based on a substituted part with a greater longevity substituted for a part with a lesser longevity.

10. The method according to claim 1 wherein the desired configuration is based on a substituted assembly with a greater longevity substituted for an assembly with a lesser longevity.

11. The method according to claim 1 further comprising updating the desired configuration based on engineering change.

12. The method according to claim 1 further comprising updating the desired configuration to facilitate compliance with a regulatory requirement.

13. The method according to claim 1 wherein the generating step includes scheduling and bringing together at least two of the following items at a specific time and place: requisite parts, technical instructions, supporting equipment, acceptance criteria and procedures, tools, and repair personnel.

14. The method according to claim 1 wherein the actual configuration is determined by disassembly and inspection of at least a portion of the mechanical equipment.

15. The method according to claim 1 further comprising defining a template for configuration data prior to populating an actual configuration database and a desired configuration database with the configuration data.

16. The method according to claim 1 further comprising the step of managing disposition of a removed component of the mechanical equipment.

17. A system for maintaining a configuration of mechanical equipment, the system comprising:

a desired configuration database for storing a desired configuration of the mechanical equipment based on a design objective of the mechanical equipment, wherein the desired configuration includes configuration data on an equipment identifier, an equipment description, an assembly identifier, an assembly description, a part identifier, a part description data, an installation location data, an installation position data, a part specification data, an assembly specification data, and an equipment data, and wherein the design objective includes at least one of safety, reliability, and performance;

an actual configuration database for storing an actual configuration of the mechanical equipment based on an evaluation of the mechanical equipment, wherein the actual configuration includes configuration data on an equipment identifier, an equipment description data, an assembly identifier, an assembly description data, a part identifier, a part description, an installed position data, an installation date, a utilization history data, a maintenance history data, a longevity information, a part specification data, an assembly specification data, and an equipment specification data;

a data processor adapted to retrieve the desired configuration from the desired configuration database and to retrieve the actual configuration from the actual configuration database, to determine if the actual configuration complies with the desired configuration, and to generate an upgrade requirement plan, in accordance with the determination, for upgrading the actual configuration to the desired configuration if the actual configuration is noncompliant.

18. The system according to claim 17 wherein a maintenance input/output device is arranged to update the configuration data in the actual configuration database.

19. The system according to claim 18 wherein the maintenance input/output device comprises a monitor for monitoring part longevity data of a part and for sending part longevity data for storage in the actual configuration database.

20. The system according to claim 18 wherein the maintenance input/output device comprises a monitor for monitoring assembly longevity data of an assembly and sending the assembly longevity data to the actual configuration database.

21. The system according to claim 17 wherein the maintenance input/output device comprises a monitor for monitoring operational performance of mechanical equipment.

22. The system according to claim 17 wherein an engineering input/output device is arranged to update the configuration data in the desired configuration database.

23. The system according to claim 17 wherein a supervisory input/output device is arranged to access a supervisory database for storing historic configurations and associated repair history data.

24. The system according to claim 17 wherein the data processor is adapted to schedule and bring together requisite parts, tools, and repair personnel at a specific time and place.

* * * * *

UNITED STATES PATENT AND TRADEMARK OFFICE
CERTIFICATE OF CORRECTION

| | |
|---|---|
| PATENT NO. | : 6,980,959 B1 |
| APPLICATION NO. | : 09/690793 |
| DATED | : December 27, 2005 |
| INVENTOR(S) | : Gary R. Garrow et al. |

It is certified that error appears in the above-identified patent and that said Letters Patent is hereby corrected as shown below:

Column 14, in claim 21, line 1, after "according to claim" delete "17" and substitute --18-- in its place.

Signed and Sealed this

Twenty-seventh Day of March, 2007

JON W. DUDAS
*Director of the United States Patent and Trademark Office*